United States Patent
Fry et al.

(10) Patent No.: US 6,256,665 B1
(45) Date of Patent: Jul. 3, 2001

(54) METHOD FOR EMULATION OF TERMINAL-RESIDENT GUI APPLICATION

(75) Inventors: Shawn C. Fry, Richmond; Gregory L. Mahan, Houston; Christopher D. Christopher, Manvel, all of TX (US)

(73) Assignee: SOTF Technologies, Inc., Dallas, TX (US)

( * ) Notice: Subject to any disclaimer, the term of this patent is extended or adjusted under 35 U.S.C. 154(b) by 0 days.

(21) Appl. No.: 09/444,797

(22) Filed: Nov. 22, 1999

Related U.S. Application Data (63) Continuation-in-part of application No. 08/430,368, filed on Apr. 28, 1995, now abandoned.

(51) Int. Cl.[7] ............................. G06F 15/173; G06F 9/45
(52) U.S. Cl. ............................. 709/208; 717/2; 703/24
(58) Field of Search .................... 717/1–5, 11; 709/208, 709/230, 302, 300, 248; 345/326, 335; 703/23, 24, 26, 27

(56) References Cited

U.S. PATENT DOCUMENTS

| | | | | |
|---|---|---|---|---|
| 5,347,632 | * | 9/1994 | Filepp et al. | 709/202 |
| 5,727,154 | * | 3/1998 | Fry et al. | 709/248 |
| 5,987,505 | * | 11/1999 | Fry et al. | 709/208 |

* cited by examiner

*Primary Examiner*—Kakali Chaki
(74) *Attorney, Agent, or Firm*—Haynes and Boone, LLP (57) ABSTRACT

A computer system and method for transmitting information in variable length information packets, each of which can be independently processed by the receiving computer irrespective of other packets, is disclosed. The invention enables the transmission of packets concerning one process to be interspersed with packets concerning other processes so that information can be exchanged between computers in the system without having to wait for the completion of an ongoing process.

13 Claims, 3 Drawing Sheets

METHOD FOR EMULATION OF TERMINAL-RESIDENT GUI APPLICATION

RELATED APPLICATIONS

This application is a, continuation in part of Ser. No. 08/430,368, filed Apr. 28, 1995 for "Method and Apparatus for Multiactive Exchanges of Information Between Computers" now abandoned and is also related to Ser. No. 08/430,457, filed Apr. 28, 1995 for Method and Apparatus for Maintaining Synchronization of Program Execution on Computers Connected by a Transmission medium.

FIELD OF THE INVENTION

The invention relates generally to systems for communication between computers and more particularly to a method and an apparatus for high speed interactive or multiactive communications between computers which are connected by dial-up phone lines.

BACKGROUND OF THE INVENTION

Personal computers (PC's) are becoming increasingly popular and their use is becoming widespread. Because of the increased popularity of PC's and the use of multiple platforms, systems for communication between individual PC's are growing increasingly important. Although dedicated lines for communication between PC's or between PC's and other computers are the most reliable means for communication, the installation of sufficient lines to meet the demand in the current market makes this means impractical. It is therefore useful to develop more efficient and reliable systems for using standard telephone lines or other limited-bandwidth means to transfer data for computer communications.

Although this specification uses language relating to telephone lines, the invention relates equally to other transmission means which are more limited in bandwidth, hence slower, than networks, which can transfer data at a speed of at least one million bits per second (bps). The invention thus contemplates operation even in direct PC-to-PC environments, in which data is transferred in excess of 100,000 bps.

The use of telephone lines for computer communications is already well known, and the use of modems to transfer computer data across phone lines is commonplace. Modems and telephone lines are currently used to transfer data from PC to PC, between PC's and electronic bulletin boards (BBS) or dial-up services (e.g., CompuServe, America Online), and between PC's and servers which provide access to the Internet (sometimes called the information superhighway). There are, however, no existing means for multiactively operating an application (a computer program) resident on a computer through communications from another computer using modem communications or similar means, including digital signal processors. ("Multiactive" is used herein to refer to the ability of the invention to carry on communications regarding more than one task and/or user at a time, and is somewhat analogous to both multitasked communications and interactive communications, as will be explained in more detail below.) Similarly, there are no means in the prior art to accomplish remote, "on the fly" programming and control of one computer from another computer. "On the fly" programming refers to constructing or altering the programming of an application while that same application is executing. By altering the programming of an executing application, a new application is created which exists in the virtual space which is herein defined as the shared memory and resources of both the terminal and host, rather than in the hard storage of the terminal, from which prior art applications are transferred into memory.

The current standard for communications over telephone lines is commonly referred to as "ANSI", and is defined by the American National Standards Institute. The ANSI scripting language, or protocol, provides for the recognition of the IBM character set and 16 color codes which can be sent from a host computer to a remote computer upon which the received characters and colors will be displayed. The ANSI protocol makes no provision for graphics of any type other than the use of the predefined characters and colors. Further, in order for a remote computer's screen display to be altered, the entire display has to be redrawn by the host, requiring re-transfer of all of the screen information, not just that part which is changed.

Somewhat more advanced, mid-level protocols have been developed, such as RIPscript. "RIP" stands for Remote Imaging Protocol. While not standardized, RIPscript allows the use of very basic graphics which can utilize icons and several types of basic figures which have been previously downloaded to the remote computer. The disadvantages of RIPscript are that the graphics have to be downloaded to the remote computer, taking up space and download time and requiring updates whenever new graphics are to be used. Another major disadvantage is that RIPscript is not standardized and thus its widespread use is almost impossible. RIPscript thus improves upon ANSI to some extent, but it is still very unstable and has limited utility.

ANSI, RIPscript and other prior art-terminal communication protocols also have the disadvantage of being susceptible to line noise, which is common on normal phone lines. Because these protocols do not incorporate error checking, there is no assurance of data integrity and data errors can cause interruption, lock-up and termination of communications and/or programs. It is also common for data errors to cause the remote and host computers to lose track of each other's status or place in corresponding programs so that one computer's responses are not matched with the other computer's queries, thus resulting in the complete uselessness of subsequent data which is error-free. This factor alone significantly limits the potential commercial use of prior art systems.

Error checking on data transfers in low bandwidth systems has previously been implemented, but these implementations have several drawbacks. Error checking in this art is usually implemented in hardware. If the error checking on each end of a transfer is not identical however, no checking at all will be accomplished. For example, if the host computer hardware uses V.42bis checking and the remote computer uses MNP5 checking, then the two computers' hardware is incompatible in this respect and no error checking will be accomplished. Although error checking may be implemented in software as well, the protocol must again be the same on both ends of the transfer or it will not work, and typically host software and remote software are written by different companies which do not follow-any set standard and thus are usually incompatible.

Prior art error checking also suffers from the drawback that file transfer protocols (which are more likely to use compatible error checking methods) use error checking following each packet of information which is sent from the host to the remote computer, but the error checking is performed on discrete packets of information having a constant length, and the software does not allow for user interaction until completion of the file transfer. It is common for a terminal user to initiate a file transfer and abandon the terminal until the transfer is complete, because the terminal is useless for other purposes until the transfer ends. These error checking methods, as well as the non-multiactive information transfers (which must be terminated to enable unrelated information to be communicated), therefore have no utility in software which is multiactive between the host and remote computers and preclude the emulation of multitasking or timesharing applications.

OBJECTS OF THE INVENTION

Because of the inability of prior art systems to emulate resident applications through programs which are resident on other computers, it is an object of the invention to provide a communications system which allows one computer having resident applications to program another computer to operate as if a non-resident program is executing on that computer.

Because of the popularity of graphical user interfaces (GUI's) and operating systems which use GUI's, such as Windows (Windows is a registered trademark of Microsoft Corp.) it is an object of the invention to provide a communications system which utilizes the remote computer's GUI to carry out functions which in the prior art are performed by the terminal package or other software packages external to the GUI. (For the purposes of the description of the invention below, the term GUI will be used to refer to both graphical interfaces and operating systems which use these interfaces.)

It is another object of the invention to provide a host/terminal communication system which reduces the amount of terminal resources. (such as hard disk space, memory, etc.) required to utilize the system by enabling the transmission of programming codes between computers and the reprogramming of applications while they are executing, thereby allowing the functionality of the terminal to be dynamically changed by the host.

It is another object of the invention to provide a host/terminal communication system which utilizes the API's or device drivers of the GUI resident on the terminal.

It is another object of the invention to provide a host/terminal communication system which automatically utilizes the current setup of the GUI on the terminal to display the output of an application.

It is another object of the invention to provide a host/terminal communication system which performs error checking on all information transferred between the host and terminal, independent of hardware, and detects substantially all of the data errors in this information.

It is another object of the invention to provide a host/terminal communication system which maintains synchronization between applications executing on the host and terminal.

It is another object of the invention to provide a host/terminal communication system which does not require external applications at the terminal to process information (e.g., display images) transmitted from the host.

SUMMARY OF THE INVENTION

The invention achieves the above objectives in a host-terminal computer system-by executing a host-resident GUI application on the terminal via the terminal's own GUI. The application is implemented using multiactive, cyclic data checking on each transmission of data between the host and terminal computers to ensure the integrity and the validity of each transmission. The invention thereby allows a remote user to transmit data to and from a host computer during an ongoing information transfer and interpret that data so that it can be processed independently of other ongoing processes. The invention also prevents the problems which normally arise from degradation of data between the host and terminal and loss of synchronization between the host and terminal.

The invention allows the terminal software package to be reprogrammed as necessary during a terminal session so that an application is constructed in the virtual space of the terminal's memory without having to be downloaded beforehand. The terminal package can thus be adapted (by reprogramming) to include only those features specifically required by the demands of-the terminal session. The reprogrammed application therefore takes up less space in RAM than a previously downloaded application (which must anticipate the user's requirements), and requires no space in a permanents storage device (e.g. magnetic/optical disk drives).

The invention also utilizes the terminal's existing GUI settings and preferences so that a single application executed by the host automatically adjusts, by implementation through the terminal's GUI, to appear as though it is being executed as a stand-alone, GUI-based application on the terminal itself. This "transparent" implementation of the host application on the terminal carries with it advantages which include improved speed and user familiarity.

DETAILED DESCRIPTION OF THE PREFERRED EMBODIMENT

The present invention provides a method and system for error-checked, synchronized, multiactive operation of host-based applications through terminal-resident GUI's. The invention is implemented in a system which generally comprises three parts: a host computer; a transmission medium; and a terminal computer. Although the terms "host" and "terminal" are used herein, it is not necessary for the purposes of the invention that the computers be different in any way or perform different functions. Both the host and terminal are configured and programmed to operate in accordance with the methods of the invention. The transmission medium may be a phone line or any other means for data transmission which is known in the art. The transmission medium completes what is sometimes termed a "virtual circuit" between the host and terminal.

Figure 1:
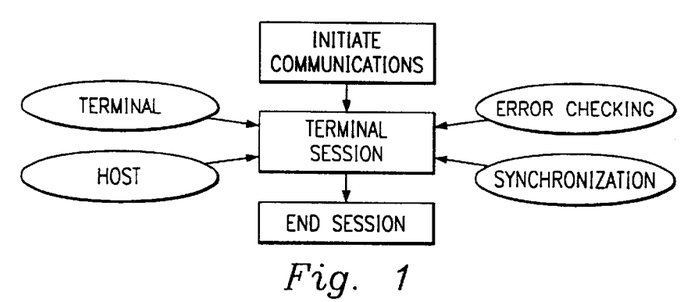
FIG. 1 is a top-level flow diagram showing the interaction of the terminal and host computers and the background operation of error checking and synchronization functions during a terminal session.

FIG. 1 generally depicts the operation of the inventive system, as one computer (the terminal) initiates communications with a second computer (the host), conducts a terminal session, and then ends communications. During the terminal session, error checking and synchronization are carried out on all exchanges of information (through graphical language macros) between the two computers.

In the preferred embodiment of the invention, the terminal is first connected via the transmission medium to the host. Typically, the terminal utilizes an ordinary modem to call and establish contact with the host via standard phone lines. Once a connection has been established, the host transmits a code to the terminal and waits for a response. This code queries the terminal for a response which indicates that the terminal is programmed to communicate with the host in accordance with the inventive methods. If the host does not receive the proper response from the terminal, the connection is terminated.

The terminal, upon receipt of the initial code, transmits a response to the host, indicating that the terminal is properly programmed. When the host receives this response, the configuration of the terminal is confirmed and all further communications between the terminal and host will utilize both error checking and data confirmation to maintain the integrity (error-free condition) of the data and synchronization between the terminal and host. A terminal session then begins. This terminal session will proceed at the direction of the terminal operator and individual sessions will vary accordingly.

Although terminal sessions will vary greatly, there are several features of the invention which are operative throughout each session and which are distinctive of the prior art. Very generally, these include highly effective, hardware independent error detection and correction, synchronization of host and terminal operations, and host manipulation of the Advanced Programmers Interfaces ("API's")of the terminal GUI to bypass unnecessary processing of data before it is displayed at the terminal. These features will be discussed in turn below.

Once the terminal responds to the query of the host and confirms that it is properly programmed, all further communications between the host and terminal incorporate what is termed for the purposes of this description "cyclic data checking" or "CDC". CDC uses 16-bit CRC error checking to test the integrity of data transferred between the host computer and the terminal computer. The 16-bit CRC error checking method is well known in the art and has been found to be 99.999% effective in detecting errors in the transmission of data. Although 16-bit CRC error checking is currently used in the art to insure the integrity of file transfers, this type of error checking has not been implemented in multiactive situations or in the transmission of variable-length information packets.

The invention allows the terminal and host computers to be "multiactive." This term is used to describe the ability of the invention to carry on several activities at the same time and transfer information to and from each computer, much the same as an operating system on an individual computer may allow the multitasking or timesharing of several different applications. In typical prior art systems, communications between terminal and remote computers are limited by the fact that one activity (e.g., a file transfer) must be completed before another can be initiated. This limitation derives from the fact that substantially all of the information transfer necessary for an activity must be accomplished at one time. Although some prior art systems have allowed concurrent file transfers, these are not two-way exchanges of information and they do not involve processes other than file transfers. In the invention, packets of information for more than one activity can be interspersed instead of having to be transferred in a single string of information packets relevant to a single activity. These packets can contain any type of information and can be transferred both to and from each computer.

Figure 2:
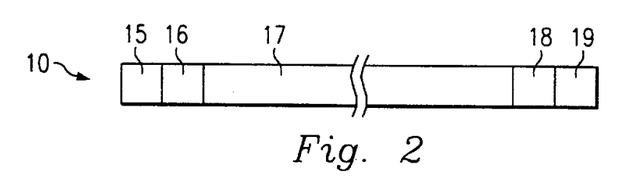
FIG. 2 is a block diagram showing the structure of the graphical language macros of the invention.

In the preferred embodiment of the invention, information which is transferred between the host and terminal is formatted into information packets called, for the purposes of this application, "graphical language macros" ("GLM's"). Each GTM, as shown in FIG. 2, contains three start bytes (15), command data (16), the information to be transmitted (17), error-checking data (18) and a three-byte end code (19). The information to be transmitted may be raw data, such as in a file transfer, a command to be executed by the receiving computer, or any other type of information. The length of this information data is variable, and it is not necessary to add meaningless bytes to the GLM to conform its total length to a fixed value, as is required for prior art error-checking methods. The GLM's may be used to transfer any type of information and are not limited to graphical information (the term "graphical language macro" is not intended to be descriptive).

The beginning and end codes in the preferred embodiment are three-byte codes which simply signal the beginning and end of the GLM's transmission to either the terminal or host. In other words, when one of the computers receives a start code, it knows that the subsequent data will be part of a new GLM—when the end code is received, the computer knows that the entire GLM has been transmitted and can be processed further. This is shown graphically in FIG. 3b. Although the preferred embodiment uses a three-byte code, any suitable code can be used to signal the beginning or end of a GLM.

When the receiving computer has received the entire GLM, it parses the GLM into its components: the command data, the variable-length information data, and the error-checking data. The receiving computer then performs CDC (cyclic data checking). In CDC, the receiving computer uses standard 16-bit CRC error checking to determine whether the error calculation on the information data matches the error-checking data component of the GLM. Any effective error checking method which is known in the art can be used to perform CDC, but 16-bit CRC checking is used in the preferred embodiment because it is effective without requiring excessive processing time. The processing speed is extremely important in low-bandwidth environments (e.g. modern communications) because, if the data transfer rate exceeds the capacity of the error checking code, information will be lost. For this reason, the teaching in the prior art was to avoid error checking every piece of transferred information.

The receiving computer then sends to the transmitting computer either an acknowledgement or a non-acknowledgement that the GLM was received intact. If the GLM is received intact, acknowledgement signal is transmitted to the computer which transmitted the GLM and the GLM is processed by the receiving computer. If the GLM contains errors, the receiving computer sends a signal to the computer which transmitted the GLM indicating that the GLM contained errors and then the receiving computer discards the GLM. The sending computer, upon receipt of the non-acknowledgement, then resends the GLM. Again, this is distinct from prior art teachings that extra processing should be avoided.

If the GLM is error-free, the receiving computer processes the GLM's information data according to the GLM's command data. Because the invention provides command data to direct the manner in which the receiving computer processes the information data, a piece of information which is too large to be transmitted in a single information packet need not be received by the receiving computer in consecutive information packets. This allows the is transmitting and receiving computers to exchange GLM's representing file transfers, program commands, user input and other information which are interspersed with each other. The invention thereby provides means for multiactive transfers of information, both in terms of transmitting information to and from one computer and in terms of transmitting program commands or other information during a multiple-packet information transfer without having to terminate the multiple-packet transfer.

Figure 3A:
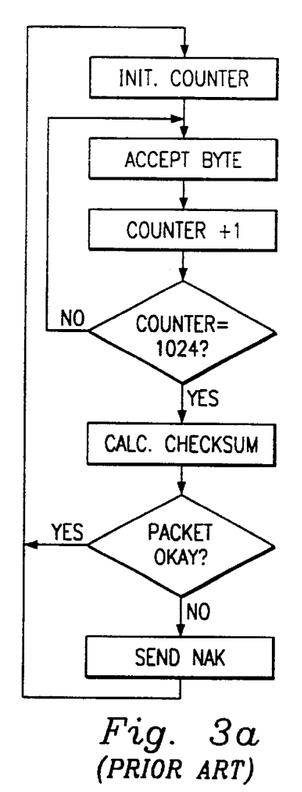
FIG. 3a is a flow diagram of a prior art error checking method.
Figure 3B:
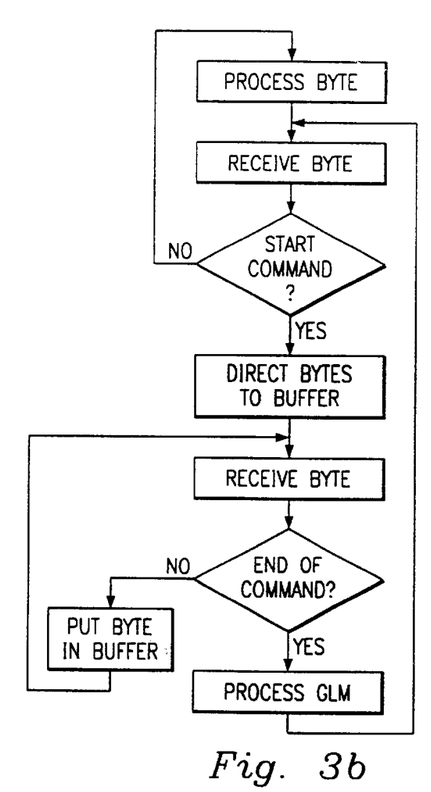
FIG. 3b is a flow diagram of the error checking method of the invention.

Using prior art methods, the transfer of a file which fills 1000 information packets, or blocks, is accomplished by transferring the blocks consecutively, without interruption, until the transfer is complete. During the transfer, no commands or other information can be transmitted, either to or from the transmitting computer. The only way to transmit such information prior to completion of the file transfer is to terminate the incomplete transfer. Prior art error checking on information/file transfers is also limited by the fact that these methods are constrained to the transfer of information packets having a set length. This limitation is shown graphically in FIG. 3a. FIG. 3a shows that the error checking method used in Z-modem file transfers must be performed on set-length blocks (e.g., 1024 bytes) because the error checking byte is defined only by its position as the 1024th byte in the information packet. A five-byte piece of information therefore requires the transmission of an additional 1019 bytes which are meaningless and which do nothing but fill the remaining space.

In the present invention, however, packets of information can be transmitted between blocks of the file transfer and interspersed with the blocks of the file transfer. The sequence of the interspersed information packets can be based on assigned priorities, timesharing principles, etc. Because each GLM contains command data to direct processing of the GLM information data: the receiving computer is directed to process these intermediate GLM's appropriately, whether the information data of the GLM is raw data, a command, or other information. When the receiving computer receives a GLM which is a continuation of a file transfer, it is directed to continue the file transfer and add the GLM's information data to the already-opened file. Prior art methods can not distinguish information packets in this manner and would simply place interspersed non-file-transfer information packets in the middle of the transferred file, thus corrupting all of the transferred information.

The invention also provides for the synchronization of the program executing on the terminal computer with the program executing on the host computer. In the preferred embodiment of the invention, synchronization of the terminal with the host is achieved by confirming the integrity and validity of each command or other transmission of information transmitted between the terminal and host.

The integrity of the information is ensured by the CDC which is performed on each GLM. If the GLM contains an error, a non-acknowledgement signal is returned to the computer which transmitted the GLM. If the GIM is error-free, the validity of the information in the GLM is determined by the receiving computer. If the information is an acceptable input to the program executing on the receiving computer, an acknowledgement is transmitted to the computer which transmitted the GLM and the information is processed. If the information is not an acceptable input to the program executing on the receiving computer, a signal indicating non-acknowledgement of the information is transmitted to the computer which transmitted the GLM.

In this manner, the computer which transmits the information does not simply move on to the next program step regardless of whether or not the receiving computer moves on as well—it waits for confirmation that the information received was intact and acceptable; and that the receiving computer is ready to move on to the next step before the transmitting computer moves to the next step itself.

Figure 4:
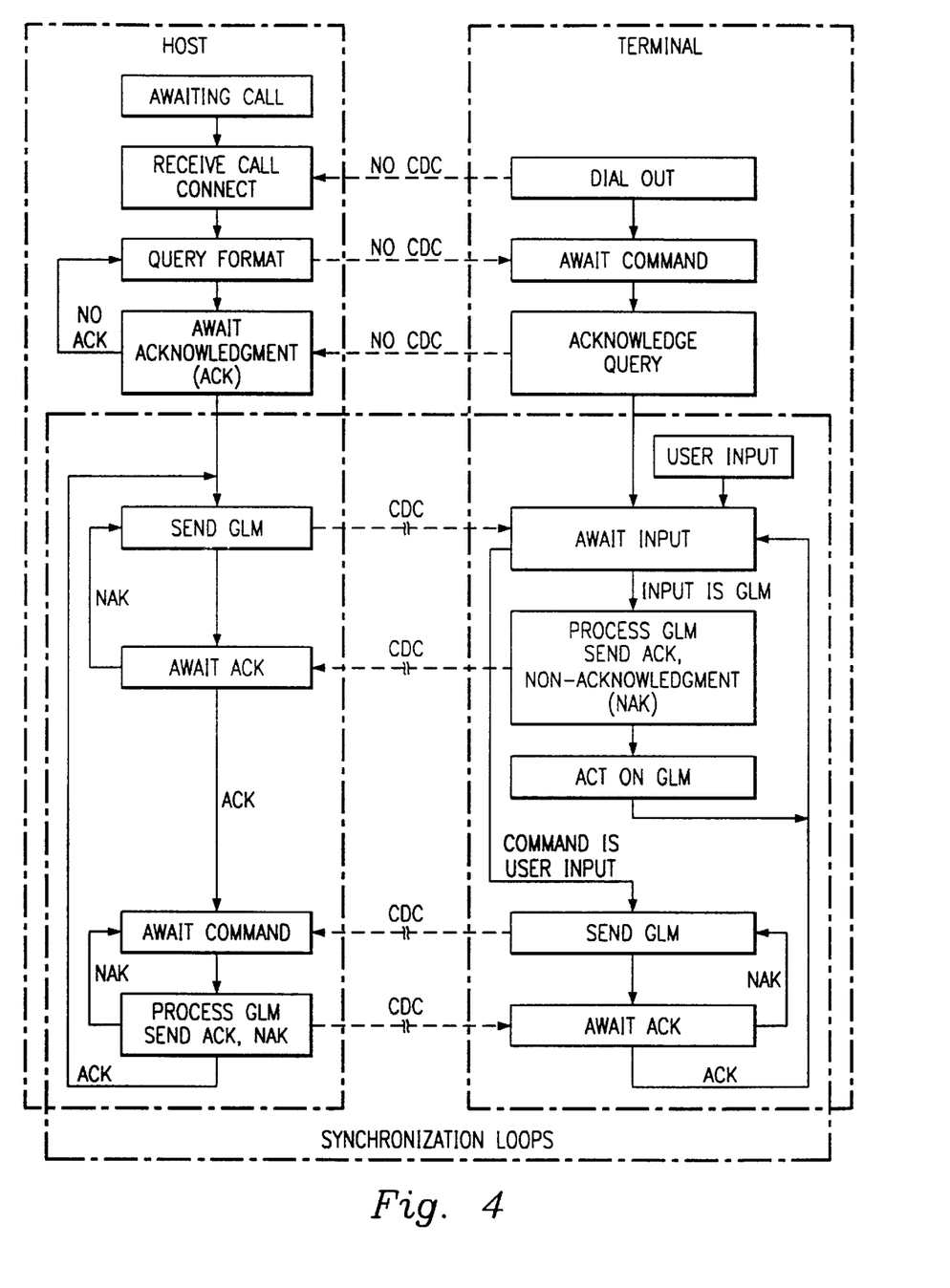
FIG. 4 is a flow diagram of the synchronization method of the invention.

FIG. 4 shows the manner in which the invention checks the GLM's and maintains synchronization. The GLM-processing step includes both the error-checking and the validity checking of the GLM. If the invention is implemented in a system in which the transmission medium between the computers is essentially error-free (e.g., a network environment), the error-checking may be eliminated so that only the validity checking is performed in the processing step.

In prior art systems, on the other hand, both the host computer and terminal computer simply issue commands or transmit data without regard to the receipt of this information by the other part of the system. Thus, when there is a data error in the information transmitted between a prior art terminal and host, the transmitting computer assumes that the information was received by the receiving computer and proceeds to move on to the next step. The receiving computer, however, upon receipt of the invalid information, cannot and does not act on the information. The terminal and host in prior art systems thereby lose synchronization, each assuming that the other either has or has not taken a particular step so that subsequent pieces of information transmitted between the two are inappropriate commands or responses. These synchronization errors are almost always fatal to the terminal session and cause it to be prematurely ended.

Another feature of t-he invention is its ability to accomplish emulation of an application program running under the terminal GUI. This is accomplished by transferring from the host computer to the terminal computer executable commands as well as simple alphanumeric data. In the preferred embodiment of the invention, the terminal software package and host software package utilize high-level programming languages to generate the API calls that initiate the API's of the terminal computer's GUI. Thus, the host computer can transmit program routines to the terminal computer which open windows to display data, format text around images, accept and process data, and perform other programming-related functions. The invention thereby also provides means for the terminal user to manipulate the information displayed on his screen. For example, the terminal user can resize images, overlap windows, uncover windows, and even manipulate displayed data (e.g., if several numbers and a sum of those numbers is displayed, the sum can be automatically updated when one of the numbers is changed). The invention also allows the components of a displayed image to be associated with one another so that, for example, a user can click on (select using the computer's mouse) an image and thereby cause associated text to be selected, changed, or otherwise manipulated. The user's manipulation of the displayed data may be implemented via commands which are transmitted between the terminal computer and host computer, and which are executed by the receiving computer or the data may be manipulated wholly within the terminal so that no host-terminal communications are required.

By utilizing the terminal computer's GUI in this manner, the invention provides substantial increases in speed over the prior art because the invention requires the transfer of only enough information to change the parts of the terminal computer's display which need to be updated. The invention thus changes only parts of the displayed image rather than the whole screen, or may simply uncover a window rather than having to re-generate an image which had been erased. These features of the invention are typically utilized in conjunction with the ability to reprogram the terminal to execute a minimal amount of program code. The host may either transfer program code which -the terminal can use to process information, or information itself if this is determined to be more efficient. The speed of the invention is also improved over the prior art because the invention can transmit executable commands or code, which may only be several bytes long, instead of lengthy streams of raw data which redraw the display.

Figure 5A:
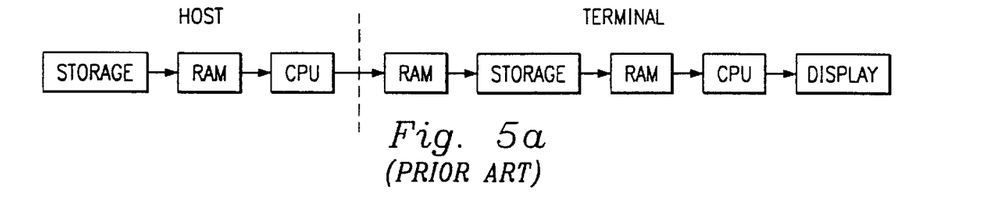
FIG. 5a is a flow diagram of the prior art method for downloading executable program code and then executing the code.
Figure 5B:
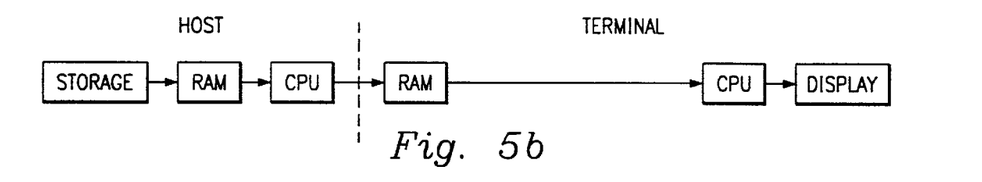
FIG. 5b is a flow diagram of the inventive method for transferring executable program code to a terminal computer and executing without having to download.
Figure 6A:
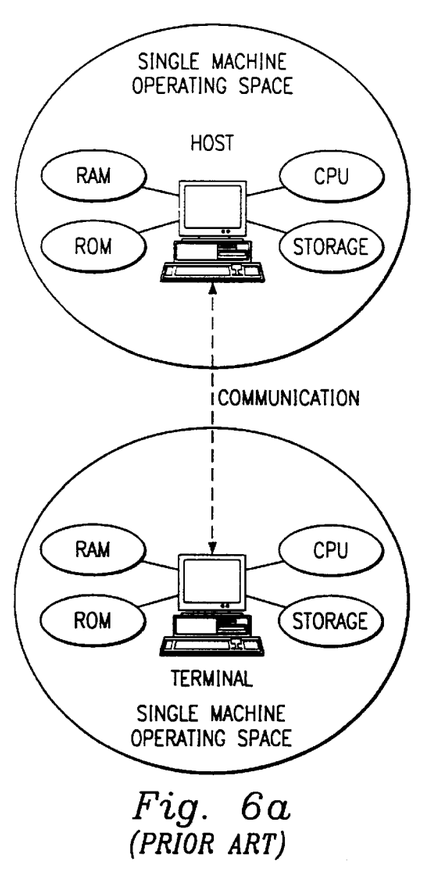
FIG. 6a is a diagram illustrating the limits of a single computer's operating space in the prior art.
Figure 6B:
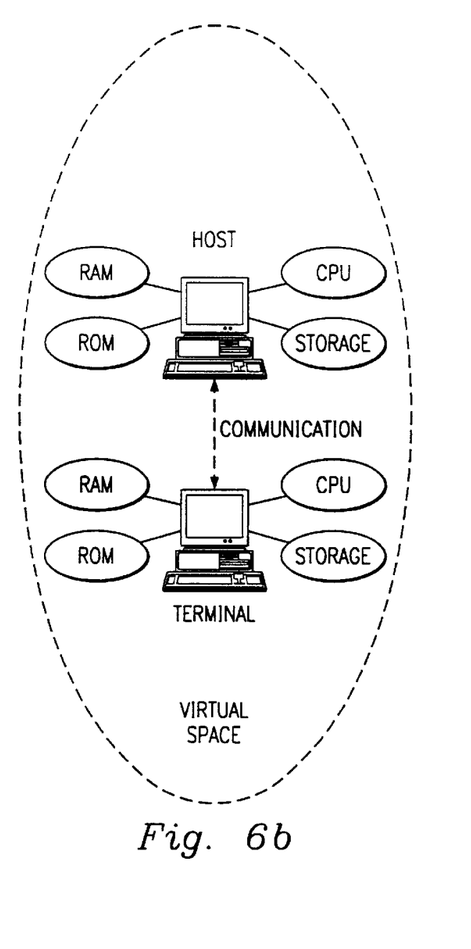
FIG. 6b is a diagram illustrating the virtual space available for execution and emulation of an application using the inventive method.

Because the invention contemplates the transmission of commands and programming code between the terminal computer and host computer instead of mere data to redraw the screen, the invention enables the host computer to program the terminal computer "on the fly". In other words, the terminal need not be pre-programmed, as are prior art systems, but can instead receive executable commands or code as needed during a terminal session. This is accomplished by providing a terminal software package which is written in an interpreted language, thus allowing program code to be inserted into the package while it is executing. The execution of the software need not be halted for recompiling, and there is no restriction or interface requirement for any of the added program code, as is the case with compiled languages. The invention thereby avoids the problems of having to download an entire program prior to beginning the terminal session and having to store all the necessary programs at the terminal. With the invention, -downloading can be limited to only those codes or commands which call the API's and which would in the prior art have to be generated by a terminal-resident package. See, generally, FIGS. 5a and 5b.

Because the invention allows the terminal program to be revised as it executes during the terminal session, the new application which is thereby created exists only in virtual space rather than on any permanent storage device. This application does not reside in the terminal's permanent storage, and disappears when the application is terminated (although the application can be easily downloaded to a permanent storage device, if desired). The size of the application may be as large as the virtual space, and typically uses less memory than a comparable downloaded application because the downloaded application includes features which are not typically employed by the terminal user. See FIGS. 5a, 5b, 6a, and 6b. (A "downloaded" application is one which has a predetermined capability and/or size and is typically downloaded in its entirety to a permanent storage device prior to its execution, but also includes such programs which are transferred as separate program modules.) The application created by the invention is therefore almost infinitely variable and allows the user to build applications which are as varied as are available through the host.

Prior art systems, on the other hand, transmit data to the terminal and then initiate terminal-resident programs, such as image viewers, to display the transmitted information. Most often, these programs are stand-alone programs which a terminal software package must initiate, supply with data, and terminate when no longer needed. Thus, they do not have the integrated functionality of a single application which incorporates all of their features. It is these stand-alone programs which generate the API calls to produce screen displays. The invention's elimination of the need for these programs saves the time required to transmit the information to these programs and the time required for these programs to generate API calls. Although these stand-alone programs may be incorporated into the terminal software package itself, they still require additional time to access and process information and generate API calls and substantially increase the size of the package and the resources required to utilize it. The invention bypasses such programs and initiates the API's which then display the information in accordance with the configuration of the GUI. The invention thereby eliminates the need for programs external to the basic terminal software, increases the speed with which the information is displayed, eliminates the need to download programs or updates thereto and eliminates the need to transmit extra information which is required by the external programs.

What is claimed is:

1. A method, implemented in a computer system, for using a host computer to emulate a GUI application on one or more terminal computers in a manner which is substantially transparent to the a user of said terminal computer, said method comprising the steps of:

(a) executing an application program selecting a first set of data on said the host computer;
     formatting the first set of data in one or more information packets, each of the information packets containing at least a portion of the first set of data, each of the information packets containing explicit command code which further contains graphical language macros for manipulating the GUI application on a terminal computer, the command code being independent from the command code in any other of the information packets, each of the information packets further having a length which is variable independently of the length of any other of said information packets;
   (b) establishing communication between a the host computer and a the terminal computer, said the terminal computer having a GUI;
   (c) transmitting from said the host computer to said the terminal computer one or more graphical language macros, said graphical language macros directly manipulating said terminal GUI information packets from the host computer to the terminal computer;
     receiving the information packets in the terminal computer; and
     the terminal computer ascertaining from the command code in each information packet action specified by the command code and performing the action on the portion of the first set of data in the information packet.

2. The method of claim 1 wherein said method is implemented by programming said terminal computer and said host computer using an interpreted language.

3. The method of claim 2 wherein said method further comprises the step of reprogramming said terminal computer via said transmitted graphical language macros.

4. The method of claim 1 wherein said method further comprises the step of performing error checking on said graphical language macros.

5. The method of claim 4 wherein said method further comprises the step of re-transmitting said graphical language macros if said error checking indicates that said graphical language macros contain one or more errors.

6. A method, implemented in a computer system, for multiactively transmitting information in independently variable length information packets between a first computer and a second computer, said method comprising the steps of:

selecting a first set of data to be transmitted;

formatting said first set of data in one or more information packets, each of said information packets including at least a portion of said first set of data and an explicit command code which specifies an action to be performed by said second computer on said portion of said first set of data, said command code being variable, independent of said command code in any other of said information packets, each of said information packets further having a length which is variable, independent of a length of any other of said information packets;

transmitting said information packets from said first computer to said second computer;

receiving said information packets in said second computer;

ascertaining from said command code in each said information packet, by said second computer, the action specified by said command code; and performing said action on said portion of said first set of data in said information packet.

7. The method of claim 6 wherein each information packet includes an explicit predetermined start code, said portion of said first set of data, said command code, and an explicit predetermined end code, wherein an actual length of each said information packet is unknown to said second computer until said second computer receives said end code.

8. The method of claim 7 wherein said start code is a first part of said packet to be transmitted and said end code is the last part of said packet which is transmitted.

9. The method of claim 6 further comprising the step of storing each information packet in a buffer by said second computer.

10. The method of claim 6 further comprising the steps of:

selecting a second set of data to be transmitted;

formatting said second set of data in one or more information packets, each of said information packets containing at least a portion of said second set of data, each of said information packets further containing an explicit command code which specifies an action to be performed by said second computer on said portion of said second set of data, said command code being variable independently of said command code in any other of said information packets, each of said information packets further having a length which is variable independently of said length of any other of said information packets;

transmitting said information packets from said first computer to said second computer, said information packets containing said portions of said first set of data being interspersed with said information packets containing said portions of said second set of data;

receiving said information packets in said second computer; and ascertaining from said command code in each said information packet, by said second computer, said action specified by said command code and performing said action on said portion of said second set of data in said information packet.

11. The method of claim 6 further comprising the steps of:

selecting a second set of data to be transmitted, said second set of data residing on said second computer;

formatting said second set of data in one or more information packets, each of said information packets containing at least a portion of said second set of data, each of said information packets further containing an explicit command code which specifies an action to be performed by said first computer on said portion of said second set of data, said command code being variable independently of said command code in any other of said information packets, each of said information packets further having a length which is variable independently of said length of any other of said information packets;

transmitting said information packets containing said portions of said second set of data from said second computer to said first computer, said information packets containing said portions of said first set of data being interspersed with said information packets containing said portions of said second set of data;

receiving said information packets containing said portions of said second set of data in said second computer;

said first computer ascertaining from said command code in each said information packet said action specified by said command code and performing said action on said portion of said second set of data in said information packet.

12. The method of claim 6 wherein said action is selected from the group consisting of: calling a local function on said second computer, importing a function to said second computer and performing said function, and performing a function on said first computer and then displaying a result on said second computer.

13. The method of claim 6 wherein said action is selected from the group consisting of: diagnostics, menuing, importing code, importing files, updating files, and updating functions.

* * * * *

UNITED STATES PATENT AND TRADEMARK OFFICE
CERTIFICATE OF CORRECTION

PATENT NO. : 6,256,665 B1  Page 1 of 1
DATED : July 3, 2001
INVENTOR(S) : Shawn C. Fry; Gregory L. Mahan; Christopher D. Christopher It is certified that error appears in the above-identified patent and that said Letters Patent is hereby corrected as shown below:

Column 10,
Line 33, please delete the word "the";
Line 35, please delete the words "(a) executing an application program";
Line 36, please delete the word "said";
Line 49, please delete "(b)" and the word "a";
Line 50, please delete the words "a" and "said";
Line 52, please delete "(c)", and the two occurences of the word "said";
Lines 53-55, please delete the words "graphical language macros, said graphical languages macros directly manipulating said terminal GUI".

Signed and Sealed this

Twenty-ninth Day of January, 2002

Attest:

Attesting Officer

JAMES E. ROGAN
Director of the United States Patent and Trademark Office